United States Patent [19]

Tibbals

[11] 3,747,660
[45] July 24, 1973

[54] BALLASTED VEHICLE TIRE AND SELF-SEALING THIXOTROPIC BALLAST COMPOSITION THEREFOR

[76] Inventor: Donald H. Tibbals, U.S. Hwy. 95 N., Yerington, Nev.

[22] Filed: Oct. 4, 1971

[21] Appl. No.: 186,521

[52] U.S. Cl. .............................................. 152/330
[51] Int. Cl. .............................................. B60c 5/00
[58] Field of Search .................................. 152/330

[56] References Cited
UNITED STATES PATENTS

| | | | |
|---|---|---|---|
| 3,003,536 | 10/1961 | Culberson et al. | 152/330 |
| 3,008,506 | 11/1961 | Hicks | 152/330 |
| 2,884,039 | 4/1956 | Hicks | 152/330 |
| 2,797,721 | 7/1957 | Hicks | 152/330 |
| 3,404,719 | 10/1968 | Priest et al. | 152/330 |

*Primary Examiner*—James B. Marbert
*Attorney*—D. C. Roylance et al.

[57] ABSTRACT

Vehicle tire at least partially filled with leak-sealing, tire ballast composition in the form of an aqueous, thixotropic mixture consisting essentially of a gel-forming clay, and an alkali metal hexametaphosphate.

14 Claims, No Drawings

BALLASTED VEHICLE TIRE AND SELF-SEALING THIXOTROPIC BALLAST COMPOSITION THEREFOR

This invention relates to a ballasted vehicle tire system and to a liquid ballast material for use in such tire systems. More particularly, this invention relates to a self-sealing, thixotropic, ballast material and to resilient vehicle tires employing such ballast material.

Farm tractors, earth-moving equipment and various other vehicles having rubber tires are often required to pull heavy loads. However, the low coefficient of friction between the rubber tires and the surface encountered, e.g., an unplowed field, substantially reduces the pulling power of the vehicle.

Various alternatives have been proposed for increasing the weight of the rear portion of the earth-moving vehicle and thus the coefficient of friction by such means as adding cast iron weights to the rear wheels. Other proposals include partially filling the tires with a frothy liquid or a ballast in the form of a finely divided powder.

Although a certain amount of success has been achieved with each of the approaches employed, there are corresponding disadvantages. For example, the addition of cast iron weights to the rear portion of a farm tractor poses handling problems in the field, while the pumping of liquids, such as an aqueous mixture of calcium chloride into tires has proven disadvantageous, since partial filling of the tire results in the low viscosity liquid moving back and forth easily in the tire. While the vehicle is in operation this surging movement causes an unbalanced dragging or loping movement thereby preventing a smooth operation of the vehicle. The further problem with such liquids is that they are normally corrosive in nature and may freeze during cold weather. Still further, upon puncture of the tire, such materials can cause sterilization of a large portion of farm land.

Other proposals including the employment of a powder-like material has overcome many of the disadvantages associated with the use of a liquid ballast in the tire material, but other problems, including difficulties in loading and unloading the tire with the powder, and "balling" up of the powder within the tire, has offset many of the advantages of employing such powdered, ballast materials.

It has now been found that the undesirable movements and vibrations caused by liquid ballast material can be overcome, and the corresponding jerkiness or loping action may be eliminated with a resultant smooth flow of power in the operation of earth-moving vehicles by employing the thixotropic, ballast material of the present invention. Surprisingly, it has been discovered that a resilient vehicle tire having an annular sealed chamber at least partially filled with a thixotropic ballast material consisting essentially of an aqueous mixture of a gel-forming clay, sand and an alkali metal hexametaphosphate overcomes the disadvantages associated with prior ballast materials. Also, the ballast material of the present invention is self-sealing to punctures which are normally encountered in earth-moving work.

When the tire is partially or completely filled with the ballast material of the present invention, the ballast has sufficient viscosity to eliminate unbalanced movements in the tire and permits a smooth flow of power in the operation of the vehicle. Moreover, in the event that the puncture of the tire occurs by an object the size of an ordinary nail or the like, the ballast composition of the present invention is self-sealing, and thus cuts down on the loss of operating time ordinarily caused by tire punctures to farm vehicles or the like. In addition, the problem of sterilization of fertile ground is eliminated, since even if the present ballast composition is spilled or in some manner comes into contact with the earth, it will not affect the fertility of the land, since it does not contain harmful chemicals. Another advantage of the present ballast composition is that it is noncorrosive to metallic wheel rims or vehicle tires thus reducing costly wear and tear.

As previously mentioned, the tire ballast composition of the present invention is an aqueous, thixotropic mixture consisting essentially of a gel-forming clay, sand and an alkali metal hexametaphosphate.

The gel-forming clay may be any of the conventional alumino silicate or the like forms of clay. The term "clay" as employed herein is used in its usual sense, i.e., a fine-grained, natural, earthy material composed primarily of hydrous aluminum silicates. However, it is preferably an alkaline earth metal clay, such as a "calcium clay." An especially preferred form of clay comprises 62.2 percent $SiO_2$ 15.75 percent $Al_2O_3$, 3.4 percent $Fe_2O_3$, and 2.8 percent $CaO$. However, other gel-forming clays including those containing alkali metal cations, e.g., sodium, may be employed. The clay should be substantially free of any corrosive acids. Thus, any gel-forming clay may be suitably employed. The gel-forming clay is the major contributor to the thixotropic nature of the ballast material of the present invention and may be employed in any suitable amounts. The term "thixotropic" is employed herein in its usual sense, e.g., materials containing suspended solids which materials are gel-like at rest, but become fluid with mechanical agitation. Suitable amounts of the gel-forming clay include between about 7.5 and about 54 percent by weight, preferably between about 15 and about 31 percent by weight.

The alkali metal hexametaphosphate, preferably sodium hexametaphosphate, is employed in the composition as a viscosity control agent. Suitable amounts of the alkali metal hexametaphosphate include, for example, between 0.001 and 0.01 percent, preferably about between 0.003 and about 0.005 percent by weight based upon the total weight of the composition. Generally, an increase in the amount of gel-forming clay will require a corresponding increase in the amount of the alkaline metal hexametaphosphate employed. An especially preferred ballast composition of the present invention consists of 18 percent clay and 0.005 percent sodium hexametaphosphate by weight.

The sand portion of the present ballast composition serves as the weight-providing element of the ballast material. The thixotropic ballast material has a suitably high viscosity to prevent the settling of the sand and permits its distribution throughout the ballast composition while the vehicle is in operation. Furthermore, since the ballast material is of a thixotropic nature and will gel while the vehicle tire is stationary, the sand is thereby distributed evenly throughout the interior of the tire.

Any suitable "sand-like" material may be employed in the ballast composition of the present invention, i.e., separate grains or particles of a detrital rock material.

For example, a typical sand has the chemical composition: 65.72 percent $SiO_2$, 16.6 percent $Al_2O_3$, and 3.1 percent CaO.

Any suitable amount of sand may be employed. However, suitable amounts include between 15 and about 62 percent by weight of the ballast composition, preferably between about 39 and about 55 percent by weight. An especially preferred ballast composition of the present invention, includes a total clay-sand content of about 70 percent by weight of the composition.

Preferably, the ballast composition includes a water soluble salt of boric acid. This material serves as a rust inhibitor in the composition. An especially preferred material for this purpose is sodium tetraborate, i.e., $Na_2B_4O_7 \cdot 10H_2O$, commonly known as "borax." However, other rust inhibiting water soluble salts may be employed. During the winter months or in a generally cold climate, any conventional antifreeze material, such as ethylene glycol, may be incorporated into the ballast composition of the present invention. It may be substituted for the boric acid salt, if desired.

Suitable amounts of the boric acid salt include between about 0.001 and about 0.01 percent by weight of the ballast composition, preferably between about 0.002 and about 0.008 percent by weight.

As previously mentioned, the ballast composition is aqueous, and contains, for example, between about 25 to 35 percent by weight, preferably between about 27 and 33 percent water. Thus, the major portion of the ballast composition of the present invention is composed of relatively inexpensive ingredients, namely, water, sand, and a gel-forming clay. The remainder of the composition is made up of only minor amounts of an alkali metal hexametaphosphate and the boric acid salt. Furthermore, unlike prior ballast compositions, there is no need to supply the necessary tire pressure by means of air pressure.

The clay and sand which are to be provided to the ballast composition may be of any suitable particle size in diameter that is convenient to permit a relatively efficient incorporation of the particles into the thixotropic mixture upon agitation. If the particles of the clay are too large, it can be difficult to incorporate the clay into the water. Clays are sticky and gummy in nature, and if the particles are too large they may tend to agglomerate and adhere to the stirring rods and resist penetration thereby requiring long periods of agitation in order to incorporate them evenly into the water. Likewise, it is desirable to have the sand suitably finely divided since this material must be also evenly distributed throughout the composition in order to provide an even weight distribution throughout the vehicle tire.

Suitable mesh sizes for the sand and clay include between about minus 50 mesh and about plus 325 mesh. The proper mesh size for the sand and clay may be easily experimentally determined with each particular batch desired.

The present ballast composition may be produced in any suitable manner. For example, a measured amount of water and boric acid salt is introduced into a mixing vessel that is provided with agitation means, e.g., stirrers, air nozzles, a recirculation pump or the like. Under conditions of constant agitation, a predetermined amount of the gel-forming clay is added and permitted to admix thoroughly with the water-boric acid salt mixture. Next, the requisite amount of sand and alkaline metal hexametaphosphate are added. The material is pumped into storage after the desired weight is reached, correcting to a desired viscosity for example, of between about 140 and about 260 centipoises (measured at about 70° F.) with additional phosphate, if necessary.

Variations in the mixing procedure may be employed. For example, the gel-forming clay and sand may be concurrently added to the mixing tank, rather than sequentially. In the event that a permanent type of antifreeze is incorporated into the composition (for example, ethylene glycol), it is necessary that the antifreeze be added before the ballast composition becomes thixotropic in nature. Thus, the antifreeze must added either prior to or concurrently with the gel-forming clay into the mixing tank.

The thixotropic ballast composition of the present invention may be employed in the vehicle tires in any suitable density. A suitable density of the ballast composition includes, for example, between about 12 and about 21 pounds per gallon, preferably between about 14 and about 18 pounds per gallon depending upon the degree of traction desired. In addition, the vehicular tire may be filled to capacity with the ballast composition, or may be employed in any suitable lesser amount. In the event that the tire is filled to below capacity with the composition of the present invention, the remaining, unfilled portion of the tire may be provided with air pressure.

Thus, for example, between about 60 and about 100 percent of the capacity of the tire may be provided with the ballast material. The ultimate user of the ballast composition can easily determine, experimentally, the correct concentration of the ballast material and the suitable tire volume of ballast material that is desirable for his particular land conditions. The coefficient of friction between the vehicle tire and the particular surface depends, in part, on the nature of the surface, i.e., whether it is unplowed field, rough concrete or some other surface.

The present invention will be further illustrated by the following, nonlimiting examples. All percentages are in percent by weight unless otherwise indicated.

EXAMPLE 1

A self-sealing, thixotropic ballast composition is prepared as hereinafter described. Initially, clay, which is taken from an open pit, is ground to the sizes shown in Table I, below:

TABLE I

| Mesh Size | Percent by Weight |
|---|---|
| plus 100 | 4.2 |
| plus 200 | 19.2 |
| plus 325 | 2.8 |
| minus 325 | 48.6 |

The clay is a "calcium clay" and has the chemical specifications set forth in Table II:

TABLE II

| Constituent | Percent by Weight |
|---|---|
| $SiO_2$ | 65.2 |
| $Al_2O_3$ | 15.75 |
| $Fe_2O_3$ | 3.4 |
| CaO | 2.88 |
| Loss on ignition | 4.6 |

The foregoing clay is added to a large mixing tank that is provided with three stirrers, each of which extend close to the outside wall of the tank. The mixing tank had been previously provided with water and borax. Additionally, air under 30 to 80 pounds of pressure is injected through ports in the bottom of the tank to provide further agitation. Still further, a recirculating pump is employed with the inlet of the pump connected to the bottom of the tank and the outlet communicating with the top of the tank for maximum agitation. Next, sand that is taken from an open pit and screened to remove ⅝ inch larger rocks is ground to the sizes indicated in Table III:

TABLE III

| Mesh Size | Percent by Weight |
|---|---|
| plus 100 | 3.2 |
| plus 325 | 44 |
| plus 200 | 26 |
| minus 325 | 26.8 |

The sand has the following chemical specification:

TABLE IV

| Ingredient | Percent by Weight |
|---|---|
| $SiO_2$ | 65.72 |
| $Al_2O_3$ | 16.6 |
| $Fe_2O_3$ | 3 |
| CaO | 3.1 |

The sand along with a predetermined amount of sodium hexametaphosphate are added to the tank with constant agitation.

The resulting ballast composition has the composition shown in Table V, below:

TABLE V

| Ingredient | Percent by Weight |
|---|---|
| Clay | 20 |
| Sand | 25 |
| Borax | 0.004 |
| Sodium hexametaphosphate | 0.005 |
| Water | remainder |

The ballast mixture has a density of approximately 15 pounds per gallon to conform with tire and tractor manufacturer's stress limits.

The following examples illustrate employment of the ballast composition in various earth-moving vehicles:

EXAMPLE 2

The ballast composition of Example 1 is pumped by means of a centrifugal water pump from storage into a commercial type front-end loader tire employing a ⅝ inch high pressure hose which is connected to a loader gun (e.g., a Firestone Hydro-Flator type loader gun) having a bleeder stem which permits the air to be removed from the inside of the tire while the tire is being filled with ballast with only minimal loss of ballast material. The tire is filled to 70 percent capacity, and is operated for six months. On removal of the tire from the wheel and the ballast composition from the tire, the tire and rim are inspected. The inspection reveals that no visible signs of wear or corrosion have resulted.

EXAMPLE 3

A farm-type tractor tire is filled to 100 percent capacity with the ballast composition of Example 1, and is employed on a tractor which does normal farm-type earth-moving jobs for a period of six months. The ballast composition provides the necessary weight to the rubber tire to provide a desirable coefficient of friction between the tire and the ground to result in smooth operation of the tractor.

At the end of the 6-month period the ballast is removed from the tire. Inspection of the tire and the rim reveal no visible signs of wear or corrosion.

The following examples illustrate the leak-sealing properties of the tire ballast composition of the present invention:

EXAMPLE 4

Three farm-type tractor tires are filled with the liquid ballast composition to 100 percent capacity in order to test the self-sealing properties of the composition. One-eighth inch nails are driven into each tire and the nails are then removed. The tires are then placed on the tractors and the tractors are employed in normal farm work. None of the tires fail due to leakage of the ballast composition.

EXAMPLE 5

The procedure of Example 4 is repeated with the exception that a large spike having a one-fourth inch diameter is driven into the tire and removed. Next, a metal screw is inserted in order to bridge the gap left by the spike. The ballast composition completely seals the resulting hole having the metal screw therein.

The thixotropic ballast composition of the prevent invention is effective in sealing holes made by ⅛ inch nails and the like, but should be employed in conjunction with a metal screw or the like when substantially larger holes result.

EXAMPLE 6

In order to further illustrate the leak-sealing properties of the present ballast composition, a tube-type tire is mounted without a tube, on a riveted rim and is filled with the ballast composition of Example 1. A small amount of leakage is initially seen at the rivets of the rim, however, this leakage seals almost immediately. No leakage is experienced in or around the tire.

The tire and wheel are placed on a farm-type tractor and are tested for three months with no visible defects appearing upon inspection.

Without intending to limit the present invention to any particular theory or mechanism, it appears that when the wheel is in motion, the thixotropic ballast composition forms a light film on the inside of the tire and the rim. The remainder of the revolving composition actually rotates on this film thus causing substantially no abrasion to the tire or rim.

This invention has been described in considerable detail with particular reference to preferred embodiments, but it will be understood that variations and modifications can be effected within the spirit and scope of the invention as described hereinabove and as defined in the appended claims.

What is claimed is:

1. A ballasted vehicle tire comprising a resilient vehicle tire having an annular, sealed chamber said chamber being at least partially filled with a thixotropic, ballast material consisting essentially of an aqueous mixture of a gel-forming clay, sand and an alkali metal hexametaphosphate.

2. A ballasted vehicle tire as described in claim 1, wherein said ballast material additionally includes a minor amount of a water-soluble salt of boric acid.

3. A ballasted vehicle tire as described in claim 2, wherein said water-soluble salt is an alkali metal salt of boric acid.

4. A ballasted vehicle tire as described in claim 3, wherein said boric acid salt is sodium tetraborate.

5. A ballasted vehicle tire as described in claim 1, wherein said alkaline metal hexametaphosphate is sodium hexametaphosphate.

6. A ballasted vehicle tire as described in claim 1, wherein said ballast material is composed of between about 5 and about 35 percent by weight of said clay and between about 10 and about 40 percent by weight of said sand.

7. A ballasted vehicle tire as described in claim 1, wherein said ballast material additionally includes a liquid antifreeze material.

8. A ballasted vehicle tire as described in claim 1, wherein said tire is substantially completely filled to capacity with said ballast material.

9. A leak-sealing tire ballast composition which comprises an aqueous, thixotropic mixture consisting essentially of between about 5 and about 35 percent of a gel-forming clay, between about 10 and about 40 percent sand, and between about 0.005 and about 0.01 percent sodium hexametaphosphate.

10. A tire ballast composition as defined in claim 9, wherein said mixture additionally contains a rust inhibiting amount of a water-soluble salt of boric acid.

11. A tire ballast composition as defined in claim 10, wherein said boric acid salt is borax.

12. A ballasted vehicle tire as described in claim 3, wherein said ballast material has a viscosity of between about 140 and about 260 centipoises, when measured at 70° F.

13. A tire ballast composition as defined in claim 9, wherein said composition contains between about 25 and about 35 percent by weight water.

14. A tire ballast composition as defined in claim 9, wherein said ballast composition has a viscosity of between about 140 and about 260 centipoises when measured at 70° F.

* * * * *